INVENTOR.
NELSON BERMAN
BY
Shenier & O'Connor
ATTORNEYS

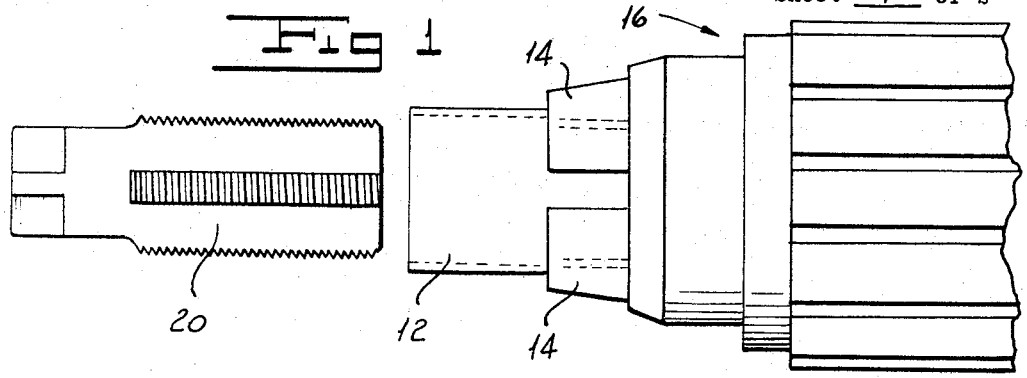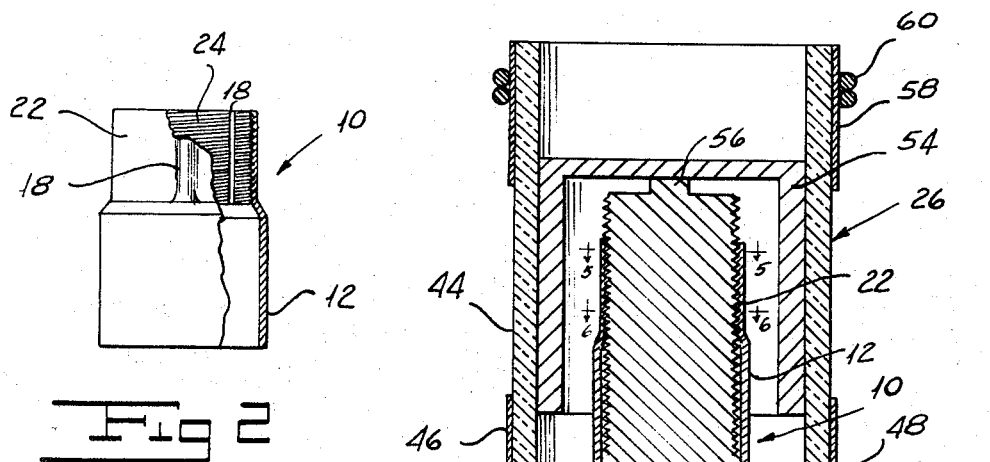

United States Patent Office 3,421,058
Patented Jan. 7, 1969

3,421,058
TRIMMER CAPACITOR
Nelson Berman, Far Rockaway, N.Y., assignor to JFD Electronics Co. Division of Stratford Retreat House, Brooklyn, N.Y., a corporation of New York
Filed Oct. 21, 1965, Ser. No. 499,553
U.S. Cl. 317—249                                                6 Claims
Int. Cl. H01g 5/00; F16b 29/00

ABSTRACT OF THE DISCLOSURE

A device for varying a circuit parameter in response to relative movement between elements in which one of the elements is carried by a screw having threads with a major diameter and with a minor diameter supported for movement in a sleeve having a wall with a generally smooth external surface and having a thickness slightly greater than half the difference between the major and minor diameters, and an inner diameter approximately equal to said minor diameter and internal threads complementary to said screw threads together with longitudinal wall ribs for biasing the sleeve threads into engagement with the screw threads in a radial direction.

---

My invention relates to a trimmer capacitor and more particularly to an improved trimmer capacitor and method of making the same, which capacitor is simpler, less expensive and which may have a smaller diameter than trimmer capacitors of the prior art.

In trimmer capacitors of the type known in the prior art one capacitor electrode is moved axially relative to another capacitor electrode in response to actuation of a screw. Usually the movable capacitor element is in the form of a piston slidably received in a tube of insulating material, such as glass, which tube carries a conductive coating making up the other capacitor electrode. The tubing has an inside diameter which differs by only a few ten thousandths of an inch from the outside diameter of the piston. A requirement of capacitors of this nature is that the piston be driven with a predetermined torque and that the device have little backlash and that the piston be not readily moved in response to shock or vibration. These considerations become more important where a more precise relative positioning of the members is required.

Heretofore, in order to meet the requirements outlined above, various arrangements have been made for providing a resilient radial force between the adjusting screw and its mounting sleeve. For example, the mounting screw has been slotted either in an axial or in a radial direction or, alternatively, the mounting tube has been cut so as to make sections of the wall provide the required radial force. Another expedient has been the use of separate springs or tensioning rings for obtaining the desired torque. All of these expedients of the prior art have a common disadvantage in that they make the capacitor relatively expensive to produce. Moreover, the smallness of the diameter of the device which can be produced is limited.

I have invented an improved trimmer capacitor which overcomes the disadvantages of trimmer capacitors of the prior art. My capacitor is simpler in construction and is less expensive to produce than are trimmer capacitors of the prior art. My construction permits the manufacture of a trimmer capacitor having a smaller diameter than do trimmer capacitors of the prior art. My device has less contact resistance and has a higher Q than do trimmer capacitors of the prior art.

One object of my invention is to provide an improved trimmer capacitor which is simpler in construction than are trimmer capacitors of the prior art.

Another object of my invention is to provide an improved trimmer capacitor which is less expensive to produce than are trimmer capacitors of the prior art.

A further object of my invention is to provide an improved trimmer capacitor which may have a smaller diameter than is possible with trimmer capacitor constructions of the prior art.

A still further object of my invention is to provide an improved trimmer capacitor having a low contact resistance and a high Q.

Yet another object of my invention is to provide a method of making trimmer capacitors in a simpler and more expeditious manner than is known in the prior art.

Other and further objects of my invention will appear from the following description.

In general my invention contemplates the provision of a trimmer capacitor in which I threadably mount the actuating screw for the movable electrode in an extremely thin walled internally threaded portion of the mounting tube. The tube wall portion is just thick enough to permit formation of the screw threads while being thin enough resiliently to engage the threads of the adjusting screw.

In manufacturing the mounting sleeve of my trimmer capacitor I place the tube in a clamping device, such as a vise or a chuck, and squeeze it until its internal diameter is approximately equal to the minor diameter of the adjusting screw threads. With the tubing in the gripping device, I form threads therein.

In assembling my improved capacitor I take the torque element and its supporting plate and thread a mandrel having an outside diameter substantially equal to the inside diameter of the insulating sleeve on the exposed threaded portion of the adjusting element. I first slip the glass sleeve over the mandrel and secure it to the mounting plate. I then remove the mandrel and slide the piston electrode into the tube in position over the adjusting screw and weld or otherwise secure the element to the screw.

In the accompanying drawings which form part of the instant specification and which are to be read in conjunction therewith and in which like reference numerals are used to indicate like parts in the various views:

FIGURE 1 is a plan view illustrating the manner in which I form the screw and supporting sleeve of my improved trimmer capacitor.

FIGURE 2 is an elevation with a part broken away of the completed screw mounting sleeve of my improved trimmer capacitor.

FIGURE 3 is a sectional view of a portion of one form of my improved trimmer capacitor.

FIGURE 4 is an elevation of an alternate form of my improved trimmer capacitor.

Figure 5:
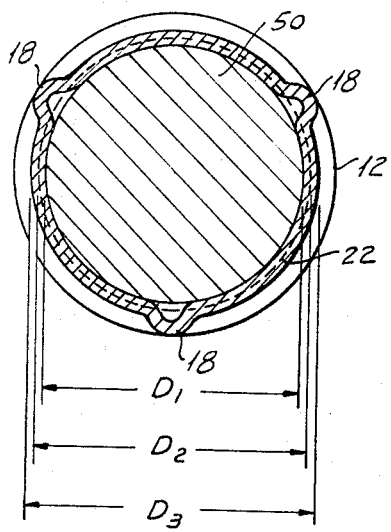
FIGURE 5 is a sectional view of my improved trimmer capacitor taken at the minor thread diameter of the adjusting screw and along the line 5—5 of FIGURE 3.

Referring now to FIGURES 1 and 2 of the drawings, in making the screw mounting sleeve indicated generally by the reference character 10 of my improved trimmer capacitor, I place a length of a relatively thin-walled metal tube 12 in the jaws 14 of a suitable clamping device indicated generally by the reference character 16 such, for example, as a three-jawed collet or chuck. Any appropriate metal such as a nickel iron alloy may be used. I select the metal tubing 12 to be one which has an internal diameter which is greater by only a few thousandths of an inch than the major diameter of the adjusting screw to be described hereinafter. The wall thickness of the tube 12 is selected to be close to the depth of the thread of the adjusting screw. Having placed the tube 12 in the jaws 14 I operate the chuck 16 to squeeze the tube until its internal diameter in the portion engaged by the chuck jaws is approximately equal to the minor diameter of the thread of the adjusting screw. It will readily be appreciated that in the course of the squeezing operation ribs 18 are formed in the areas between the chuck jaws of the portions of the tube 12 within the chuck. While the tubing is still in the chuck, I form the internal thread in the squeezed portion by means of a tap 20. After the thread is formed the threaded section of the tube is squeezed slightly more.

As a result of the operations described above, there is formed the supporting sleeve 10 from the tube 12 having a reduced diameter portion 22 having internal threads 24 and having ribs 18 spaced around portion 22 by distances corresponding to the size of the chuck jaws 14. When in a manner to be described the adjusting screw is engaged with the threads 24 the thin wall in the area of the threads 24 provides a resilient radial force which grips the screw threads so as to provide the required torque while substantially eliminating backlash. It will readily be understood that if an attempt is made to make the wall too thin the threading operation cannot be achieved. On the other hand, if the wall is too thick the required radial force will not result.

Referring now to FIGURE 3, my improved adjusting element mounting sleeve may be assembled in one form of my improved trimmer capacitor indicated generally by the reference character 26. In that form of my capacitor I solder the sleeve 10 to a flange 28 of a supporting element 30 as indicated at 32. The mounting element 30 extends through an opening 34 in a support 36, which opening is provided with a flat 38 which cooperates with a corresponding flat 40 on the member 30 so as to resist turning of the same relative to the support 36. A nut 42 is screwed onto the member 30 securely to retain it in position on the support 36.

The dielectric of the form of my capacitor illustrated in FIGURE 3 is formed by a tube 44 formed of a suitable material such, for example, as glass. A first area of conductive material 46 adjacent the bottom of the sleeve 44 is secured to the flange 28 by soldering or welding 48 to permit electrical connection to be made to one of the capacitor electrodes. The portion 22 of the sleeve 10 threadably receives the actuating screw 50 of my capacitor. I provide the screw 50 with a tool-receiving slot 52 which permits the screw to be turned to move it axially with reference to the sleeve 10. I may form the screw 50 from the same nickel iron alloy as the sleeve.

I mount the piston electrode 54 of my capacitor within the sleeve 44 and on the screw 50 for movement therewith by welding the electrode 54 to a boss 56 on the upper end of the screw 50. The other electrode of my capacitor is made up by a conductive coating 58 on the outside of the tube 44. Leads 60 secured to the coating 58 permit electrical connections to be made to the external circuit. Piston 54 may also be nickel iron alloy.

Referring to FIGURE 4 I have shown a portion of a modified form of my improved trimmer capacitor adapted to be used in connection with a printed circuit or the like rather than in the panel mounting shown in FIGURE 3.

In the form of my capacitor illustrated in FIGURE 4 I mount the assembly indicated generally by the reference character 62 of the adjusting screw and its sleeve on a washer 64 to which I secure a lead 66 soldered or otherwise attached to the washer to permit the device to be mounted on a circuit board.

Figure 6:
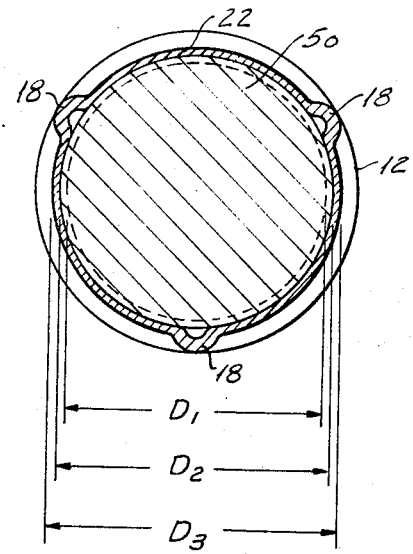
FIGURE 6 is a sectional view of my improved trimmer capacitor at the major diameter of the adjusting screw and along the line 6—6 of FIGURE 3.
Figures 7, 8, 9, 10:
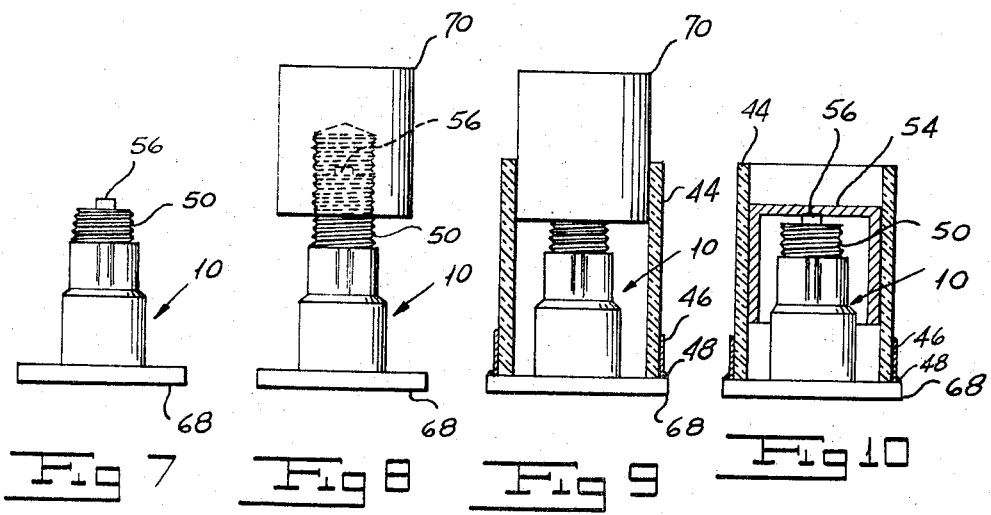
FIGURE 7 is an elevation illustrating the first step in assembly of my improved trimmer capacitor.
FIGURE 8 is an elevation illustrating the second step in my method of assembling my improved trimmer capacitor.
FIGURE 9 is an elevation with a part in section illustrating a further step in my method of assembling my improved trimmer capacitor.
FIGURE 10 is an elevation with parts in section illustrating the final steps in my method of assembling my improved trimmer capacitor.

Referring to FIGURES 5 and 6, $D_1$ represents the minor thread diameter of the screw 10 while $D_2$ represents the major diameter of the screw threads and $D_3$ represents the outer diameter of the tube wall portion 22. It can be seen that the portion of the wall 22 outside the internal screw threads or $D_3-D_2$ is extremely thin. It is sufficiently thin so that this wall portion resiliently engages its threads with the threads of the screw. At the same time the ribs 18 give this wall portion a measure of structural strength.

As has been pointed out hereinabove, capacitors of the type to which my invention relates include a drawn glass tube 44 which has a precise internal diameter. The adjustable element 54 is precision ground to its outside diameter. There exists only a few ten thousandths of an inch clearance between the tubing 44 and the element 54 when the device is assembled. If breaking of the glass tube is to be avoided it is necessary that the adjustable element and the pitch diameter of the adjusting screw be precisely concentric with the glass tube. In the prior art this requirement necessitates the use of precision parts and accurate assembly methods. I have invented a method of assembling my trimming capacitor so that the only precision parts need be the glass tube 44 and the ground adjustable element 54. Referring to FIGURES 7 to 10 in my method of assembling my trimmer capacitor, I start with the assembly of the adjusting screw 50 and the sleeve 10 mounted on a disc or flange 68. With this assembly I then thread a mandrel 70 on the exposed portion of the adjusting screw 50. Mandrel 70 has precisely the same diameter as that of the screw adjustable element 54, and has an internal thread which is concentric with the outside diameter. With the mandrel 70 on the screw 50 I slide the glass tube 44 over the mandrel and down toward the disc 68 and then solder the tube conductive coating 46 to the base 68 with the solder 48.

After soldering the tube 44 in place I remove the mandrel and insert the adjustable piston element 54 into the tube. Having placed the adjustable element 54 in the tube I bring it down into engagement with the end of the screw 50 and weld the element to the boss 56 on the upper end of the screw 50 by any suitable technique such, for example, as by percussive discharge welding. This method not only does not require precision parts for other than the glass tube and the adjustable element 54 but it results in a non-protruding weld which reduces corona effects in high voltage applications.

In making my improved trimmer capacitor I first place the tube 12 in the jaws 14 of the chuck 16 and squeeze the tube wall until the inner diameter thereof is about equal to the minor diameter of the threads of screw 50. In the course of squeezing the tube wall strengthening ribs 18 are formed. I next form the threads 24 by use of the tap 20. After the thread is formed the thread section of the tube is squeezed slightly more as pointed out above.

The following table is illustrative of particular examples of the relationship between thread size and tube wall thickness for various materials:

| Material | Thread size* | Wall thickness (before threading) (in.) |
| --- | --- | --- |
| 303 stainless steel | 5-56 | 0.012 |
| 304 stainless steel | 120 NM | 0.005 |
| Brass | 2-56 | 0.010 |
| Phosphor bronze | 10-64 NS | 0.015 |

*Screw Thread Standards for Federal Services, 1957 Handbook H28, Part I.

Having formed the sleeve 10 I solder the sleeve either to the flange 28 or to the disc 64 or to a disc 68. When that has been done, I screw the mandrel 70 on the exposed end of screw 50, slide the tube 44 over the mandrel and solder it to flange 28 or to disc 64 or 68. The mandrel is then removed and the adjustable element 54 is slid into the tube and after it has centered itself I weld the element to the boss 56 on the end of the screw. Owing to the fact that I use the threaded sleeve 10 I am able to use a larger diameter screw 50 in a capacitor of a given size than is possible in the prior art. The larger diameter screw reduces the screw inductance to improve the Q of the capacitor. Conversely, I am also able to form a smaller diameter device than is possible in the prior art.

In operation of my improved capacitor the wall portion 22 of the sleeve 10 resiliently grips the screw 50 providing the required torque with very little backlash. The position of the element 54 with relation to the element 58 may be varied to set the capacitance of the device by turning screw 50 through the medium of the slot 52.

It will be seen that I have accomplished the objects of my invention. I have provided an improved trimmer capacitor which is simpler and less expensive than are trimmer capacitors of the prior art. My capacitor may be made of smaller diameter than are capacitors of the prior art. It has a low contact resistance and a high Q for the same size capacitor than is possible in the prior art. Corona effects in high voltage applications are reduced. While I have described my invention in terms of a trimmer capacitor it is to be understood that the techniques described are applicable to other telescoping adjusting devices than trimmer capacitors.

While I have shown the thin walled tube internally threaded, it will be understood by those skilled in the art that the parts may be reversed. In other words my invention may be practiced by using a thin walled tube for supporting the element 54 and this supporting tube squeezed and then externally threaded to cooperate with circular threads formed on element 12. If desired, the thin walled tube may be first threaded and then squeezed.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. An interthreaded assembly including in combination a screw having threads with a major diameter and a minor diameter and a mounting tube having a metallic wall of a thickness close to half the difference between said major and minor diameters, said tube having a first portion with an inside diameter greater than said major diameter and a second portion with an inside diameter approximately equal to said minor diameter and threads complementary to said screw threads in said second portion.

2. An assembly as in claim 1 including reinforcing ribs in said second tube portion.

3. A device for varying a circuit parameter including in combination a cylindrical element, a piston-like element received by said cylindrical element for movement with respect thereto to vary said parameter, an actuating screw connected to said piston-like element, said screw having threads with a major diameter and a minor diameter, a metallic mounting sleeve for said screw, said mounting sleeve having a wall with a generally smooth outer surface, said wall having a thickness slightly greater than half the difference between said major diameter and said minor diameter and an inside diameter substantially equal to said minor diameter and internal threads formed in said wall and complementary to said screw threads.

4. A precision trimmer capacitor comprising in combination a dielectric cylinder, a first capacitor element on said cylinder, a second piston-like capacitor element received by said cylinder for movement with respect thereto, an actuating screw connected to said second element, said screw having threads with a major diameter and a minor diameter, a screw mounting tube having an unslotted wall with a generally smooth outer surface, said wall having a thickness slightly greater than half the difference between said major and minor diameters, said tube having a first portion with an inside diameter greater than said major diameter and a second portion with an inside diameter approximately equal to said minor diameter and threads complementary to said screw threads in said second portion, said second wall portion being resilient to bias the threads into engagement.

5. A capacitor as in claim 4 including longitudinal ribs in said second portion.

6. A device for varying a circuit parameter including in combination a cylindrical element, a piston-like element received by said cylindrical element for movement with respect thereto to vary said parameter, and interthreaded elements for moving said piston-like element relative to said cylindrical element, one of said elements having screw threads with a major diameter and a minor diameter, the other element comprising a metallic sleeve having a wall with a generally smooth outer surface, said wall having a thickness approximately equal to half the difference between said major diameter and said minor diameter and an inside diameter substantially equal to said minor diameter and threads formed in said wall complementary to said screw threads.

References Cited

UNITED STATES PATENTS 2,757,346   7/1956   Lahaye.

FOREIGN PATENTS 768,410   2/1957   Great Britain.

LARAMIE E. ASKIN, *Primary Examiner.*

E. A. GOLDBERG, *Assistant Examiner.*

U.S. Cl. X.R.

85—32; 151—21